United States Patent
Huang et al.

(10) Patent No.: US 9,946,250 B2
(45) Date of Patent: Apr. 17, 2018

(54) SERVO ACTUATOR DEFAULT DISCONNECTED ID SETTING METHOD FOR SERVO CONTROLLING SYSTEM

(71) Applicant: UBTECH Robotics Corp., Shenzhen (CN)

(72) Inventors: Tingshuang Huang, Shenzhen (CN); Youjun Xiong, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 15/342,143

(22) Filed: Nov. 3, 2016

(65) Prior Publication Data

US 2018/0004190 A1 Jan. 4, 2018

(30) Foreign Application Priority Data

Jun. 30, 2016 (CN) .......................... 2016 1 0514818

(51) Int. Cl.
*G05B 11/32* (2006.01)
*G05B 19/4093* (2006.01)

(52) U.S. Cl.
CPC .............. *G05B 19/4093* (2013.01); *G05B 2219/34013* (2013.01)

(58) Field of Classification Search
CPC ......... H04L 12/40013; H04L 12/40039; H04L 12/4625; H04L 67/10; G06F 1/26; Y02B 60/32; G05B 15/02; G05B 19/414; G05B 2219/33147; G05B 2219/33166; G05B 2219/33176
See application file for complete search history.

(56) References Cited

U.S. PATENT DOCUMENTS

| | | | | |
|---|---|---|---|---|
| 4,825,438 A * | 4/1989 | Bennett | ............... | G06F 11/0751 710/100 |
| 6,744,147 B2 * | 6/2004 | Taniguchi | ........... | B60R 16/0207 307/10.1 |
| 8,392,731 B2 * | 3/2013 | Asano | ............... | H04L 12/40013 700/297 |
| 8,874,813 B2 * | 10/2014 | Horihata | ........... | H04L 12/40013 710/60 |
| 2003/0151513 A1* | 8/2003 | Herrmann | ............ | G08B 25/003 340/573.1 |
| 2005/0166241 A1* | 7/2005 | Kim | ................... | H04N 5/44513 725/81 |
| 2009/0128080 A1* | 5/2009 | Cheng | ................. | G05B 19/0423 318/625 |
| 2010/0299466 A1* | 11/2010 | Asano | ............... | H04L 12/40013 710/105 |

(Continued)

*Primary Examiner* — Jorge L Carrasquillo

(57) ABSTRACT

A servo actuator default disconnected ID setting method is performed by a servo actuator controlling system, which includes a plurality of servo actuators. A first message is broadcasted which indicates that an original ID is replaced with a non-default-disconnected to the plurality of servo actuators. The original ID of each actuator is replaced with the non-default-disconnected according to the first message. A second message is broadcasted which indicates that the non-default-disconnected ID is replaced with a default disconnected ID. And the non-default-disconnected ID of each servo actuator is replaced with the default disconnected ID according to the second message.

5 Claims, 10 Drawing Sheets

(56) References Cited

U.S. PATENT DOCUMENTS

| | | | |
|---|---|---|---|
| 2011/0035521 A1* | 2/2011 | Horihata | H04L 12/4625 |
| | | | 710/106 |
| 2013/0179702 A1* | 7/2013 | Asano | H04L 12/40013 |
| | | | 713/300 |
| 2015/0120002 A1* | 4/2015 | Kim | G05B 15/02 |
| | | | 700/19 |

* cited by examiner

SERVO ACTUATOR DEFAULT DISCONNECTED ID SETTING METHOD FOR SERVO CONTROLLING SYSTEM

CROSS REFERENCE TO RELATED APPLICATIONS

This application claims priority to Chinese Patent Application No. 201610514818.4, filed Jun. 30, 2016, which is hereby incorporated by reference herein as if set forth in its entirety.

BACKGROUND

1. Technical Field

The present disclosure generally relates to servo control technology, and particularly to a servo actuator default disconnected ID setting method for a servo controlling system.

2. Description of Related Art

Robots are widely used in our daily life and entertainment. A robot may include a master controller and a plurality of servo actuators. The plurality of servo actuators are electrically connected to the master controller via buses in series and/or in parallel. The master controller transmits control signals via buses for controlling the plurality of servo actuators to perform actions.

The buses can be Multiple Servo Motor Control Bus (MSMCB). The master controller communicates with the plurality of servo actuators via the MSMCB. The master controller sends a command to the plurality of servo actuators via the MSMCB. The plurality of servo actuators send a feedback signal to the master controller, thus the master controller can obtain an operating state of the servo actuator.

Each servo actuator has an ID, and the master controller can selectively communicate with one servo according to the ID. The ID can be stored in an Electrically Erasable Programmable Read-Only Memory (EEPROM) of the servo actuator. Each of the plurality of servo actuators includes an output interface and an input interfere. The input interface is electrically coupled to the bus or an output interface of a previous servo actuator. The ID of each of the plurality of servo actuators is set up before assembling and each servo is arranged in a correct position. However, when one of the servos is replaced or the ID of one of the plurality of servo actuators is wrong, the robot cannot work normally.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
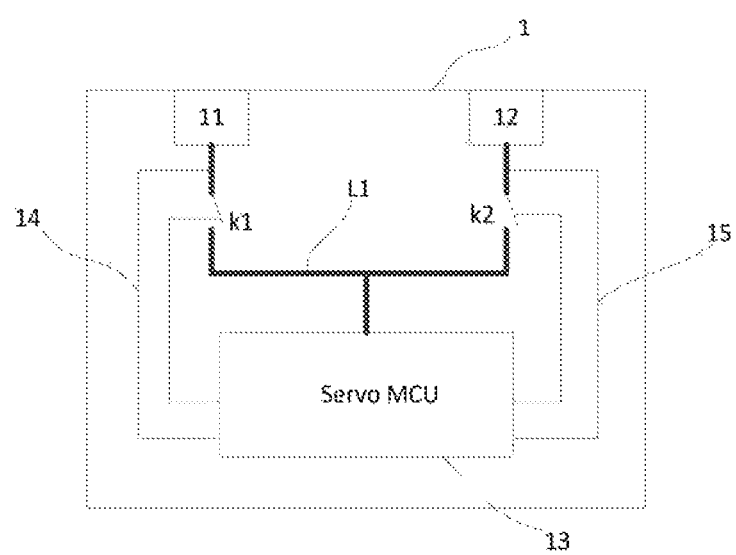
FIG. 1 is a diagrammatic drawing of a servo actuator according to one embodiment.

The disclosure is illustrated by way of example and not by way of limitation in the figures of the accompanying drawings, in which like reference numerals indicate similar elements. It should be noted that references "an" or "one" embodiment in this disclosure are not necessarily to the same embodiment, and such references can mean "at least one" embodiment.

Referring to FIG. 1, a servo actuator 1 can include a Micro Controller Unit (MCU) and two interfaces. The MCU of the serves actuator 1 can be denoted as a servo MCU 13. The servo MCU 13 is electrically coupled to the two interfaces via a first internal bus L1. In the embodiment, the servo actuator 1 can be a servo motor, which includes a speed regulating gear box, a motor, a potentiometer, and a control circuit. Each of the two interfaces is electrically coupled to a power line (VDD, not shown) and a ground line (GND, not shown). The first internal bus L1 can be a Multiple Servo Motor Control Bus (MSMCB). The MSMCB can transmit data according to Inter-Integrated Circuit ($I^2C$) protocol or Universal Asynchronous Receiver and Transmitter (UART) protocol.

The two interfaces are labeled as a first interface 11 and a second interface 12. The first interface 11 and the second interface 12 can serve as an output interface or an input interface.

The servo actuator 1 can further include a first servo switch k1 and a second servo switch k2. The first servo switch k1 is electrically coupled between the first interface 11 and the servo MCU 13. The second servo switch k2 is electrically coupled between the second interface 12 and the servo MCU 13. The first switch k1 and the second switch k2 can be controlled by the servo MCU 13.

An external bus L2 (shown in FIG. 4) is connected between a master controller 2 (shown in FIG. 2) and the first interface 11 or the second interface 12 of a servo actuator 1. The servo actuator 1 can be controlled by the master controller 2 via the external bus L2.

The servo actuator 1 can further include a first connection line 14 connected between the first interface 11 and the servo MCU 13 and a second connection line 15 connected between the second interface 12 and the servo MCU 13. The servo MCU 13 can detect an access signal of the first interface 11 via the first connection line 14 and an access signal of the second interface 12 via the second connection line 15. When the first servo switch k1 and the second servo switch k2 are turned off, the servo MCU 13 can detect which of the first interface 11 and the second interface 12 is the output interface or the input interface via the first connection line 14 and the second connection line 15. When the first interface 11 receives the access signal, the first interface 11 is the input interface and the second interface 12 is the output interface. When the second interface 12 receives the access signal, the first interface 11 is the output interface and the second interface 12 is the input interface.

The servo actuator 1 can further include a storage to store an ID of the servo actuator 1. The storage can be selected from one of the group of a flash memory, a buffer, and an Electrically Erasable Programmable Read-Only Memory (EEPROM).

Figure 2:
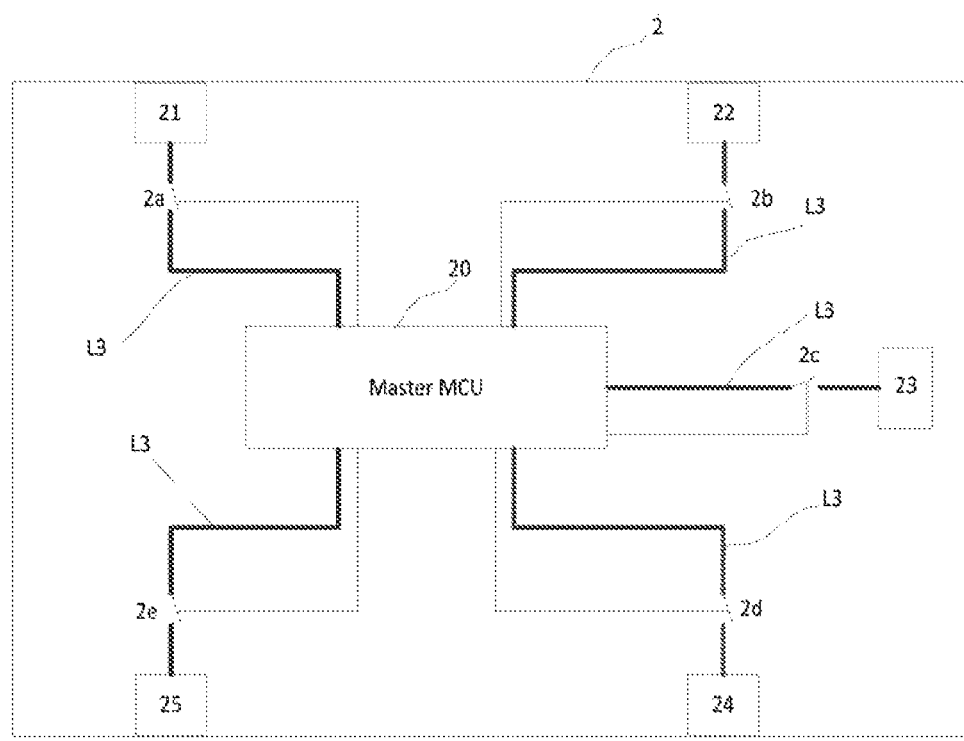
FIG. 2 is a diagrammatic drawing of a master controller according to one embodiment.
Figure 3:
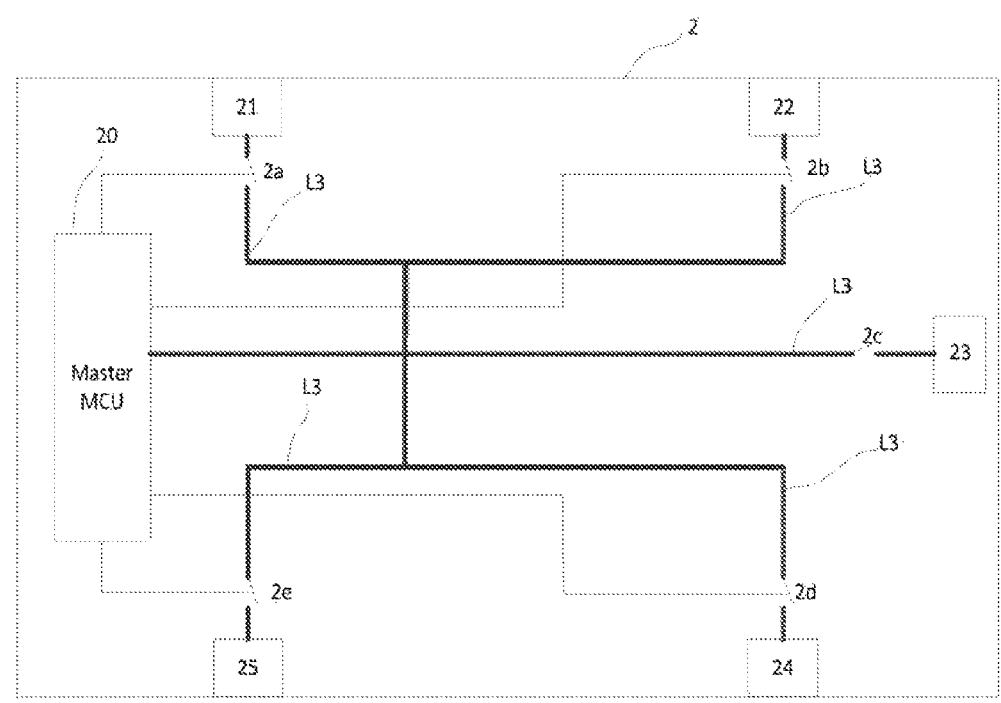
FIG. 3 is a diagrammatic drawing of a master controller according to another embodiment.

Referring to FIGS. 2 and 3, a master controller 2 can include a master MCU 20 and a plurality of interfaces. The number of the interfaces can be set by need. Preferably, the master controller 2 includes interfaces whose quantity is selected from one to six. A plurality of servo actuators 1 can be electrically connected to the plurality of interfaces. In the embodiment, the master controller 2 includes five interfaces, which are labeled as a first interface 21, a second interface 22, a third interface 23, a fourth interface 24, and a fifth interface 25. In one embodiment, the plurality of interfaces can be electrically coupled to a plurality of pins of the master MCU 20 via a second internal bus L3. Master switches are connected between the plurality of interfaces and corresponding pins of the master MCU 20, respectively. The master MCU 20 can simultaneously broadcast the same message or different messages to the plurality of interfaces. In one embodiment, the plurality of interfaces can be electrically coupled to one pin of the master MCU 20 as shown in FIG. 3. A master switch is connected between each of the plurality of interfaces and the pin of the master MCU 20. The master MCU 20 can broadcast the same message to the plurality of interfaces at a time.

The master switches are arranged in the second internal bus L3, and a control terminal of each master switch is electrically connected to the master MCU 20. The master MCU 20 can control on and off of the master switches. Specially, a first master switch 2a is arranged in the second internal bus L3 and connected to the first interface 21, a second master switch 2b is arranged in the second internal bus L3 and connected to the second interface 22, a third master switch 2c is arranged in the second internal bus L3 and connected to the third interface 23, a fourth master switch 2d is arranged in the second internal bus L3 and connected to the fourth interface 24, and a fifth master switch 2e is arranged in the second internal bits L3 and connected to the fifth interface 25. Control terminals of the first master switch 2a, the second roaster switch 2b, the third master switch 2c, the fourth master switch 2d, and the fifth master switch 2e are electrically connected to the master MCU 20.

Figure 4:
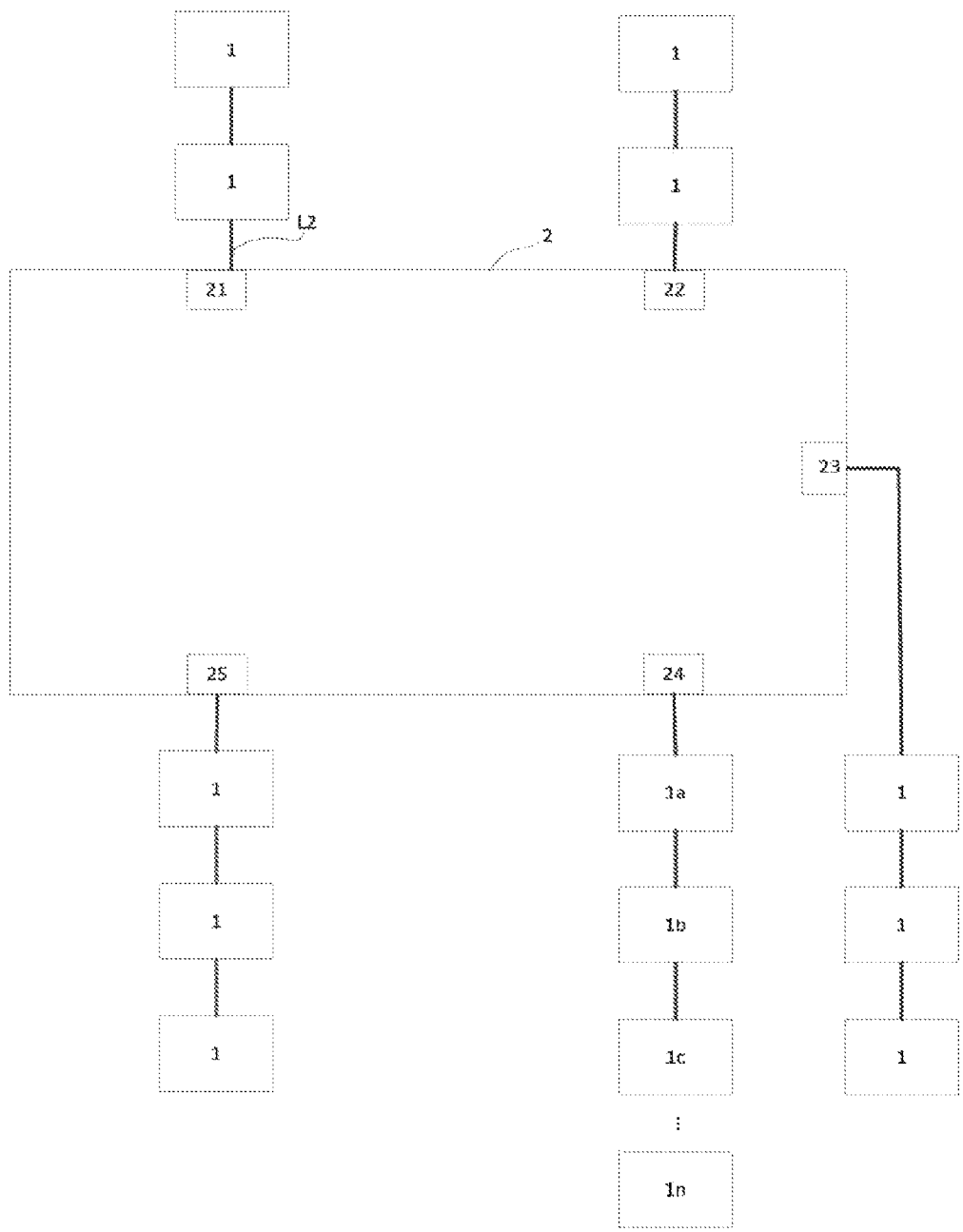
FIG. 4 a diagrammatic drawing of a servo controlling system according to one embodiment.

FIG. 4 shows a servo controlling system including the master controller 2 and the plurality of servo actuators 1. The plurality of servo actuators 1 are electrically coupled to the master controller 2 in a plurality of branches. Each branch of the servo actuators 1 is electrically coupled to one interface of the master controller 2. The number of the each branch of the servo actuators 1 can be set by need. In the embodiment, the first interface 21 is electrically coupled to two servo actuators 1; the second interface 22 is electrically coupled to two servo actuators 1; the third interface 23 is electrically coupled to three servo actuators 1; the fourth interface 24 is electrically coupled to n servo actuators, which are labeled as a first servo actuator 1a, a second servo actuator 1b, a third servo actuator 1c, and a nth servo actuator 1n; and the fifth interface 25 is electrically coupled to three actuators 1.

The first servo actuator 1a, the second servo actuator 1b, the third servo actuator 1c, and the nth servo actuator 1n are coupled to the fourth interface 24 via the bus L1 in series. In detail, one of the two interfaces (e.g. the first interface 11, which is served as the input interface) of the first servo actuator 1a is connected to the fourth interface 24, and the other of the two interfaces (e.g. the second interface 12, which is served as the output interface) is serially connected to one of the two interfaces (e.g. the first interface 11, which is served as the input interface) of the second servo actuator 1b, and so on. Thus, the plurality of servos actuators 1a to 1n are coupled to the master controller 2 in series.

During ID setting process of the plurality of servo actuators, the servo MCU 13 of a current servo actuator determines whether the first interface is the input interface or the output interface via the first connection line 14. When the first interface is input interface, and the second interface is output interface, the servo MCU 13 of the current servo actuator 1 can read a message from the bus L1 via the first interface 11 and the first connection line 14, the ID of the current servo actuator 1 is set according to the message. And then the first servo switch and second servo switch are turned on, a next servo actuator 1 is connected to the bus L1. The next servo actuator 1 performs similar process with the current to set ID. And the ID of each of plurality of servo actuators 1 can be set.

In the embodiment, the master controller 2 and each of the plurality of servo actuators 1 can function as one node, and the master controller 2 is a master node, each of the plurality of servo actuators 1 is a slave node.

When the fourth master switch 2d of the fourth interface is turned off, the first servo actuator 1a, the second servo actuator 1b, the third servo actuator 1c, . . . and the nth servo actuator 1n are in disconnected state and cannot receive message from the master controller 2. When the fourth master switch 2d of the fourth interface is turned on, the first servo actuator 1a, the second servo actuator 1b, the third servo actuator 1c, . . . and the nth servo actuator 1n can receive the message from the master controller 2. When the servo switch connected to the input interface of one servo actuator is turned off, the one and next servo actuators are in a disconnected state. When the servo switch connected to the input interface of the current servo actuator is turned on and the servo switch connected to the output interface of the current servo actuator is turned off, the next actuators are in the disconnected state.

In the embodiment, when the previous servo actuators before the one servo actuator are in the connected state, the first servo switch k1 and the second servo switch k2 are turned off, and the one servo actuator 1 and the next actuators cannot connect to the master controller 2 and receive no message from the master controller 2.

When previous servo actuators 1 before the one actuator are in a connected state, which can receive the messages from the master controller 2, the one actuator can connect to the master controller via the servo switch connected to the input interface and control the next actuators to connect to the master controller via the servo switch connected to the output interface. The servo MCU 13 of the one servo actuator 1 can detect which of the first interface 11 and the second interface is the input interface or the output interface via a first access signal of the first connection line 14 and a second access signal of the second connection line 15. If the one servo actuator 1 is needed to connect to the master controller 2, the servo MCU 13 of the servo actuator 1 turns on the servo switch connected to the input interface, thus the one servo actuator 1 is connected to the master controller 2.

If the servo MCU 13 of the servo actuator 1 controls the servo switch connected to the output interface to turn on, the next servo actuators can connect to the master controller 2. When the servo switch connected to the output interface of the current servo actuator 1 is turned off, the next actuators cannot connect to the master controller 2.

Figure 5:
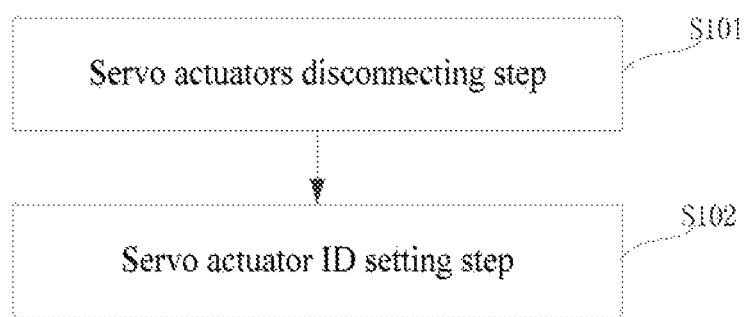
FIG. 5 is a flowchart of a servo actuator ID setting method according to one embodiment.

FIG. 5 shows a flowchart of a servo actuator ID setting method according to one embodiment. Depending on the embodiment, additional steps may be added, others removed, and the ordering of the steps may be changed.

The plurality of interfaces of the master controller 2 is selected to turn on in sequence, the following steps are repeatedly performed to set servo actuators ID of the servo actuators connected to the plurality of interfaces of the master controller.

In step S101, servo actuators disconnecting step: the plurality servo actuators 1 are set in a predetermined disconnected state. In the predetermined disconnected state, the message broadcasted by the master controller 2 cannot be transmitted to the next servo actuators.

In step S102, servo actuator ID setting step: the master controller 2 broadcasts a message to the bus L3. The message indicates that an original ID is replaced with a target ID. The servo MCU 13 of the servo actuator which is directly connected to the interface of the master controller 2 detects which of the first interface and the second interface is the input interface via the first connection line 14 and the second connection line 15. If the first interface is the input interface, the second interface is the output interface. If the first interface is the output interface, the first interface is the output interface. The servo switch connected to the input interface is turned on and the servo actuator 1 is connected to the master controller 2. Take the fourth interface 24 for example, the message is received by the first servo actuator 1a, the original ID of the first servo actuator 1a is replaced by the target ID. And then the servo switch connected to the output interface is turned on, such that the second servo actuator 1b can receive the message from the master controller 2. The step S102 is repeatedly performed until all servo actuators ID of the servo actuators 1 are set. The target ID of each of the plurality of servo actuators is unique.

In the embodiment, the target ID of the first servo actuator 1a is set as 1#; the target ID of the second servo actuator 1b is set as 2#; the target ID of the third servo actuator 1c is set as 3#; . . . and the target ID of the nth servo actuator 1d is set as n#.

Figure 6:
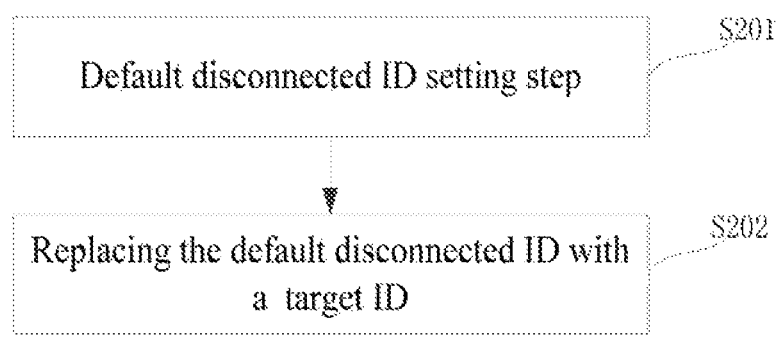
FIG. 6 is a flowchart of a servo actuator ID setting method including step S201 according to another embodiment.

FIG. 6 shows a flowchart of a servo actuator ID setting method according to another embodiment. Depending on the embodiment additional steps may be added, others removed, and the ordering of the steps may be changed.

The plurality of interfaces of the master controller 2 are selected to turn on in sequence, the following steps are repeatedly performed to set servo actuators ID of the servo actuators connected to the plurality of interfaces of the master controller.

In step S201, default disconnected ID setting step: the master controller 2 broadcasts a first message to all servo actuators connected to the plurality of interfaces of the master controller 2, which denotes that the servo actuator is disconnected from the master controller 2. The first message indicates that an original ID is replaced with a default disconnected ID. The original ID of each of the plurality of servo actuators is replaced with the default disconnected ID according to the message. The default disconnected ID is stored in the storage. When a servo actuator ID is the default disconnected ID, the servo switch connected to the input interface is set to be turned on and the servo switch connected to the output interface is set to be turned off. When the servo actuator ID is different from the default disconnected ID, the two servo switches connected to the input and output interfaces are set to be turned on. The default disconnected ID is set by need. In the embodiment, the default disconnected ID is 0xFF.

In step S202, the master controller 2 broadcasts a second message indicating that the default disconnected ID is replaced with a target ID. Thus, each of the plurality of servo actuators is sequentially connected to the master controller 2. Once a servo actuator is connected to the master controller 2, the default disconnected ID of the servo actuator is replaced with the target ID. Then the two servo switches of the servo actuator are turned on, and the next servo actuator is connected to the master controller 2. The step S202 is repeatedly performed until all servo actuators ID of the servo actuators 1 are set. Each target ID of each of the plurality of servo actuators is unique.

In the embodiment, the ID of all servo actuators 1 are set as the default disconnected ID. When the servo actuator ID is the default disconnected ID, the servo switch connected to the input interface is set to be turned on and the servo switch connected to the output interface is set to be turned off. And then the master controller 2 broadcasts the second message indicating that the default disconnected ID is replaced with a target ID. Thus, each of the plurality of servo actuators sequentially receives the second message and the default disconnected ID of the servo actuator is replaced with the target ID, and the two servo switches connected to the output interfaces are turned on. The next servo actuator can receive the second message. In other words, any one servo actuator cannot connect to the master controller before the ID of previous servo actuator is set.

In an initial state, take the fourth interface 21 for example, only the servo switch connected to the input interface of the first servo actuator 1a is turned on; the first servo actuator 1a is electrically coupled to the master controller 2 to receive the second message. The servo actuators 1 after the first servo actuator 1a cannot connect to the master controller 2. When the default disconnected ID of the first servo actuator 1a is replaced with the target ID, the servo switch connected to the output interface of the first servo actuator 1a is turned on. And the default disconnected ID of the second servo actuator 1b is replaced by the target ID in a similar manner with the first servo actuator 1a.

Figure 7:
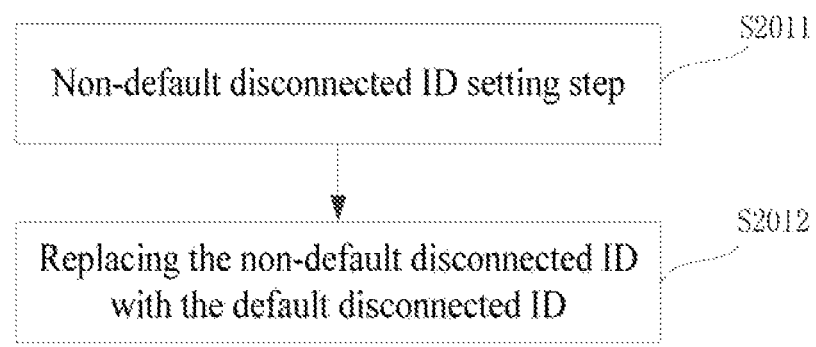
FIG. 7 is a flowchart of the step S201 of FIG. 6.

FIG. 7 shows a flowchart of a servo actuator ID setting method according to another embodiment. Depending on the embodiment, additional steps may be added, others removed, and the ordering of the steps may be changed.

In step S2011, the master controller 2 broadcasts a first message indicating an original ID is replaced with a non-default-disconnected ID. The non-default-disconnected ID is different from the default disconnected ID, and denotes that the servo actuator can communicate with the master controller 2. The original ID of each of the plurality of servo actuators is replaced with the non-default-disconnected ID according to the first message. The master controller 2 reads back and checks whether there is a default disconnected ID in the bus L1. In other words, the master controller 2 reads back and checks whether a servo actuator ID is the default disconnected ID. If the servo actuator ID is the default disconnected ID, the master controller 2 keeps broadcasting the first message until the all servo actuators ID are set as the non-default-disconnected ID. The non-default-disconnected ID can be set by need, which is different with the default disconnected ID. In the embodiment, the non-default-disconnected ID is set as 0xFE. The two servo switches of each of the plurality of servo actuators are set to be turned on, and each of the plurality of servo actuators can receive the message sent by the master controller 2.

In step S2022, the master controller 2 broadcasts a second message indicating the non-default-disconnected ID is replaced with a default disconnected ID. The non-default-disconnected ID of each of the plurality of servo actuators is replaced with the default disconnected ID according to the second message.

Figure 8:
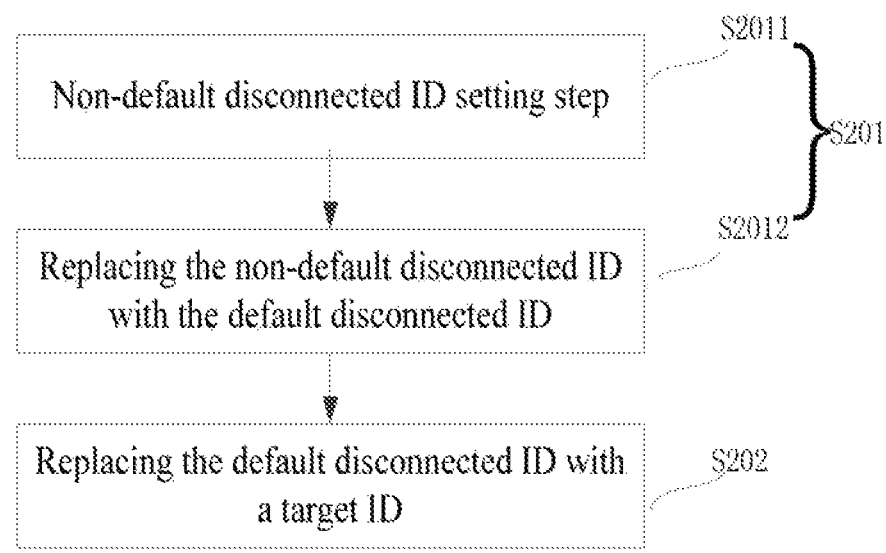
FIG. 8 is a flowchart of a servo actuator ID setting method according to another embodiment.

FIG. 8 shows a flowchart of a servo actuator ID setting method according to another embodiment. Depending on the embodiment, additional steps may be added, others removed, and the ordering of the steps may be changed. The servo actuator ID setting method of FIG. 8 is similar to the servo actuator ID setting method of FIG. 5 except that the step S201 is replaced with the steps S2011 and S2012 of FIG. 6.

The plurality of master switches of the interfaces of the master controller 2 are selected to turn on in sequence, the following steps are repeatedly performed to set servo actuators ID of the servo actuators connected to the plurality of interfaces of the master controller. In the embodiment, referring also to FIGS. 2-4, when the first master switch 2a of the first interface 21 is set to be turned on, the other master switches of remaining interfaces are set to be turned off; the servo actuators ID of the servo actuators connected to the first interface 21 are set. Similarly, when the second master switch 2b of the second interface 22 is set to be turned on, the other master switches of remaining interfaces are set to be turned off; the servo actuators ID of the servo actuators connected to the second interface 22 are set. When the third master switch 2c of the third interface 23 is set to be turned on, the other switches of remaining interfaces are set to be turned off; the servo actuators ID of the servo actuators connected to the third interface 23 are set. When the fourth master switch 2d of the fourth interface 24 is set to be turned on, the other switches of remaining interfaces are set to be turned off; the servo actuators ID of the servo actuators connected to the fourth interface 24 are set. When the fifth master switch 2e of the fifth interface 25 is set to be turned on, the other switches of remaining interfaces are set to be turned off; the servo actuators ID of the servo actuators connected to the fifth interface 25 are set. A switching order of the plurality interfaces is not limited to the first interface, the second interface, . . . the nth interface, any one interface can be selected to firstly be turned on, and then the other interfaces are set to be turned on one by one until the servo actuators ID of each branch of servo actuators are set.

Figure 9:
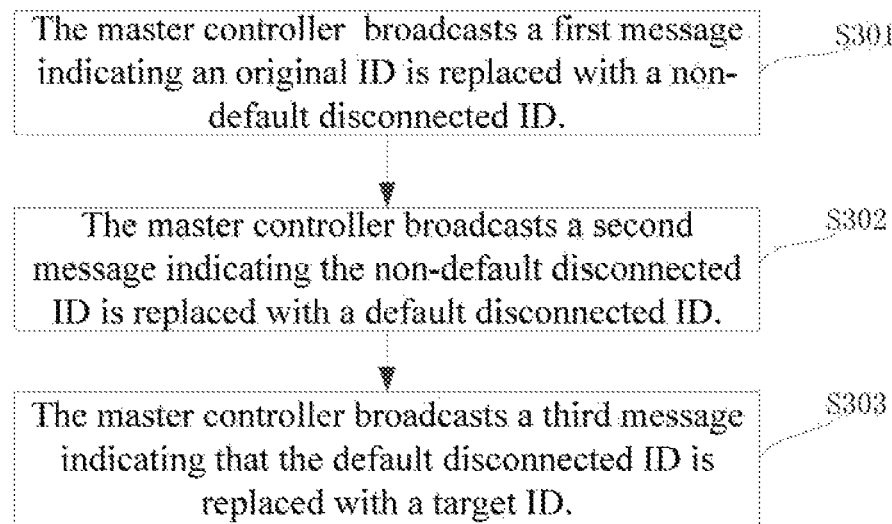
FIG. 9 is a broadcast flowchart to a plurality of servo actuators of a master controller according to one embodiment.

FIG. 9 shows a broadcast flowchart to a plurality of servo actuators of a master controller according to one embodiment. Depending on the embodiment, additional steps may be added, others removed, and the ordering of the steps may be changed.

In step S301, the master controller 2 broadcasts a first message indicating an original ID is replaced with a non-default-disconnected ID. The original ID of each of the plurality of servo actuators is replaced with the non-default-disconnected ID according to the first message. The master controller 2 reads back and checks whether there is a default disconnected ID in the bus L1. In other words, the master controller 2 reads back and checks whether a servo actuator ID is the default disconnected ID. When the servo actuator ID is the default disconnected ID, the master controller 2 keeps broadcasting the first message until the all servo actuators ID are set as the non-default-disconnected ID, and step S302 is performed. In the embodiment, the non-default-disconnected ID is set as 0xFE.

In step S302, the master controller 2 broadcasts a second message indicating the non-default-disconnected ID is replaced with a default disconnected ID. The non-default-disconnected ID of each of the plurality of servo actuators is replaced with the default disconnected ID according to the second message. In the embodiment, the default disconnected ID is 0xFF.

In step S303, the master controller 2 broadcasts a third message indicating that the default disconnected ID is replaced with a target ID. The default disconnected ID of each of the plurality of servo actuators is replaced with the target ID. The step S303 is repeatedly performed until all servo actuators ID of the plurality of servo actuators 1 are replaced with the target ID. When the master controller broadcasts the third message, the master controller 2 reads back and cheeks whether the default disconnected ID of the one servo actuator which can receive the third message is replaced with the target ID. When the default disconnected ID of the one servo actuator is replaced with the target ID, the master controller 2 broadcasts the third message to the next servo actuator. The target ID of each of the plurality of servo actuators is unique. Take the fourth interface 24 for example, when the default disconnected ID (0xFF) of the first servo actuator 1a is replaced with the target ID (0x01) the master controller 2 broadcasts the third message including the target ID (0x02) to the next servo actuator. Preferably, the target ID increases or decreases in order. Such as, the target ID increases from 0x01, 0x02, . . . to 0x0n or decreases from 0x0n, . . . to 0x02, 0x01.

Figure 10:
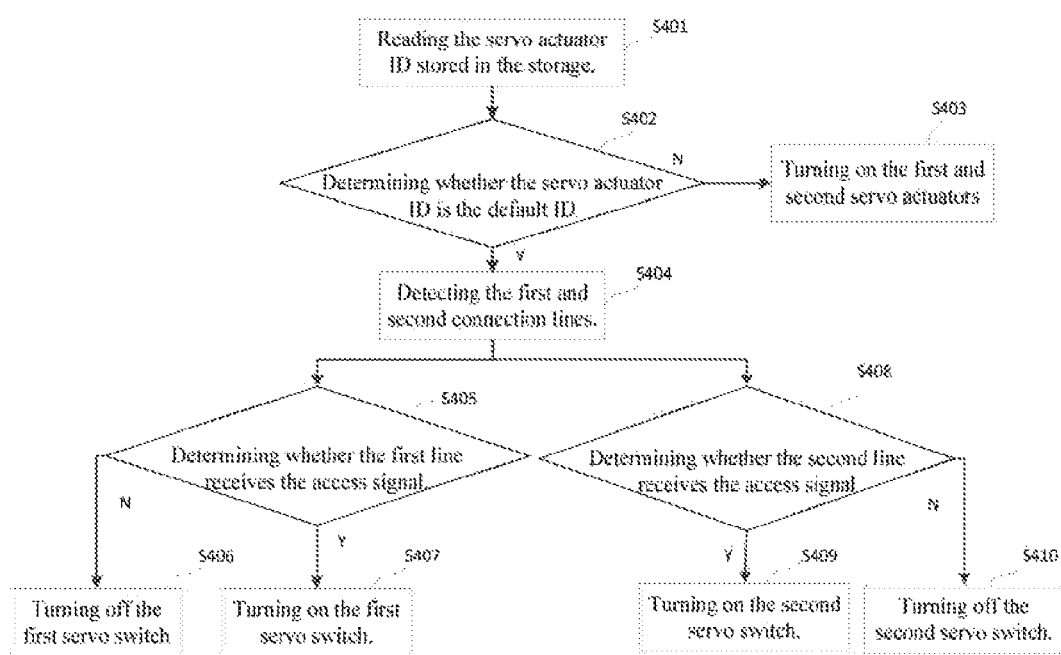
FIG. 10 is a flowchart of each of the plurality of servo actuators of FIG. 9.

FIG. 10 shows a flowchart of each of the plurality of servo actuators of FIG. 9.

In step S401, reading the servo actuator ID stored in the storage by the servo MCU 13.

In step S402, determining whether the servo actuator ID is the default disconnected ID. When the servo actuator ID is not the default disconnected ID, step 403 is performed; when the servo actuator ID is the default disconnected ID, step 404 is performed.

In step S403, turning on the first servo-switch k1 and the second servo switch k2.

In step S404, detecting whether the first connection line 14 and the second connection line 15 has an access signal, and step S405 and S406 are performed.

In step S405, determining whether the first connection line 14 receives the access signal. When the first connection line 14 doesn't receive the access signal, step S406 is performed; when the first connection line 14 receives the access signal, step 407 is performed.

In step S406, turning off the first servo switch k1.

In step S407, turning on the first servo switch k1.

In step S408, determining whether the second connection line 15 receives the access signal. When the second connection line 15 doesn't receive the access signal, step S409 is performed; when the second connection line 15 receives the access signal step S410 is performed.

In step S409, turning on the second servo switch k2.

In step S410, turning off the second servo switch k2.

In step S403, when the current servo actuator ID is not the default disconnected ID, the first and second servo switches are set to be turned on, such that the current servo actuator 1 can receive the message broadcasted by the master controller 2. And then the servo actuator 1 can perform a certain action according to the message broadcasted by the master controller 2. When the servo actuator ID of the previous servo actuator 1 before the one servo actuator 1 is the default disconnected ID, the one servo actuator 1 cannot receive the message broadcasted by the master controller 2.

In steps S404 to S410, when the servo actuator ID of the one servo actuator 1 is the default disconnected ID, the servo MCU 13 detects which of the first interface and the second interface is the input interface or the output interface via the first connection line 14 and the second connection line 15. The first interface is the input interface and the second interface is the output interface or the first interface is the output interface and the second interface is the input interface. And then the servo switch of the input interface is set to be turned on and the servo switch of the output interface is set to be turned off. Such that the one servo actuator can connect to the master controller via the bus L1 and perform the certain action, such as setting the target ID. When the first interface is the input interface, the first servo switch k1 is set to be turned on, and the second servo switch k2 is set to be turned off.

In the embodiment, when the step S301 is performed by the master controller 2, the steps S401-S403 are simultaneously performed by the servo actuators connected to the one interface of the master controller 2. As the original IDs of most of the plurality of servo actuators are not the default disconnected ID (e.g. 0xFF), such that each of the plurality of servo actuators receives the broadcasted message from the master controller 2 and the original ID is replaced with the non-default-disconnected ID (e.g. 0xFE). Even if the original ID of one part of the plurality of servo actuators are the default disconnected ID, the default disconnected ID is replaced with the non-default-disconnected ID via steps S401, S402, and S404-S410, the next servo actuators can receive the broadcasted message from the master controller to replace the original ID with the non-default-disconnected ID. The original IDs of the all servo actuators are replaced with the non-default-disconnected ID.

The step S302 is performed by the master controller 2. The master controller 2 broadcasts the message to the all servo actuators via the external bus L2, such that the non-default-disconnected IDs of all servo actuators are replaced with the default disconnected ID. When the non-default disconnected-ID of one servo actuator is replaced with the default disconnected ID, in a next cycle, the steps S401, S402, and S404-S410 are performed, such that the servo switch connected to the input interface is set to be turned on and the servo switch connected to the output interface is set to be turned off. Thus, only the first servo actuator connected to any one of the plurality of interfaces of the master controller 2 can receive the broadcasted message from the master controller 2.

The step S303 is performed by the master controller 2. The master controller 2 broadcasts the third message to the first internal bus L1. When the master controller 2 broadcasts the third message first time to replace the default disconnected ID with the target ID, only the first servo actuator 1 can receive the third message. The steps S401, S402, S404-S410 are performed by the first servo actuator 1, the default disconnected ID is replaced with the target ID (e.g. 0x01). The master controller 2 reads back and cheeks that the ID setting process of the first servo actuator 1 is completed. And in a next cycle of the broadcast, the master controller 2 broadcasts a next third message which is different from a last third message having the target ID (e.g. 0x02), the steps S401-S403 are performed by the first actuator 1, but the target ID (0x01) is not be replaced. The steps S401, S402, and S404-S410 are performed by the second actuator 1, the default disconnected ID of the second servo actuator 1 is replaced with the target (0x02). The master controller 2 reads back and checks that the ID setting process of the second servo actuator 1 is completed. And in a next cycle of the broadcast, the master controller 2 broadcasts a next third message which is different from the last third message having the target ID (e.g. 0x03), the steps S401-S403 are performed by the first and second actuators, but the target ID (0x01 and 0x02) is not be replaced. The steps S401, S402, and S404-S410 are performed by the third actuator 1, the default disconnected ID of the third servo actuator 1 is replaced with the target (0x03). The master controller 2 keeps broadcasting the third message until the all servo actuators are set as the target IDs.

In the servo actuator ID setting method, the master controller 2 broadcasts the messages, and each of the plurality of servo actuators can automatically complete ID setting according to the messages.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented identifier (ID) setting method, comprising:
providing at least two servo actuators comprising a first servo actuator and a second servo actuator connected in sequence, the first servo actuator and the second servo actuator each comprising a first interface and a second interface, the first servo actuator and the second servo actuators coupled to an interface of a master controller of a servo controlling system via a bus, the master controller comprising a micro controller unit (MCU);
broadcasting, by the master controller, a first message to the servo actuators, the first message indicating that an original ID of the servo actuators is replaced with a non-default-disconnected ID, wherein the non-default-disconnected ID is different from a default-disconnected ID;
detecting, by the servo actuators, which of the first interface and the second interface of the servo actuators receives the first message;
when the first interface receives the first message, setting the first interface to be an input interface by the servo actuators, and setting the second interface to be an output interface by the servo actuators;
turning on the input interfaces and the output interfaces of the servo actuators when a current ID of the servo actuators is same as the non-default-disconnected ID;
broadcasting a second message to the servo actuators by the master controller, the second message indicating that the non-default-disconnected ID is replaced with the default-disconnected ID;
replacing the non-default-disconnected ID of the servo actuators with the default-disconnected ID by the servo actuators according to the second message; and
turning on the input interface of the servo actuators and turning off the output interface of the servo actuators when the current ID of the servo actuators is same as the default-disconnected ID.

2. The computer-implemented method as claimed in claim 1, wherein the first interface and the second interface are turned on or off by a first servo switch and a second servo switch.

3. The computer-implemented method as claimed in claim 2, wherein the first interface and the second interface is detected by a first connection line between the first interface and the MCU and by a second connection line between the second interface and the MCU.

4. The computer-implemented method as claimed in claim 2, wherein the current ID is stored in a storage of the servo actuators.

5. The computer-implemented method as claimed in claim 2, wherein the servo actuators are configured in a plurality of branches, wherein the servo actuators of each branch are connected in series and electrically coupled to the interface of the master controller.

* * * * *